(12) United States Patent
Dorn et al.

(10) Patent No.: US 6,978,772 B1
(45) Date of Patent: Dec. 27, 2005

(54) EGR COOLING AND CONDENSATE REGULATION SYSTEM FOR NATURAL GAS FIRED CO-GENERATION UNIT

(75) Inventors: Gerald R. Dorn, Reno, NV (US); Ranson R. Roser, Reno, NV (US)

(73) Assignee: Chapeau, Inc., El Dorado, CA (US)

( * ) Notice: Subject to any disclaimer, the term of this patent is extended or adjusted under 35 U.S.C. 154(b) by 0 days.

(21) Appl. No.: 10/867,926

(22) Filed: Jun. 15, 2004

Related U.S. Application Data

(63) Continuation-in-part of application No. 10/361,538, filed on Feb. 10, 2003, now Pat. No. 6,748,932, and a continuation-in-part of application No. 10/838,126, filed on May 3, 2004, which is a continuation of application No. 10/356,826, filed on Feb. 3, 2003, now Pat. No. 6,729,133.

(51) Int. Cl.[7] .................. F02M 25/07; F02B 29/04; F01N 3/02
(52) U.S. Cl. .................. 123/568.12; 60/321; 60/599; 60/605.2
(58) Field of Search .................. 123/568.11, 568.12, 123/563; 60/321, 602, 605.2, 599

(56) References Cited

U.S. PATENT DOCUMENTS

| | | | | |
|---|---|---|---|---|
| 3,074,390 A | * | 1/1963 | O'Laughlin | 123/568.12 |
| 3,662,722 A | | 5/1972 | Sarto | |
| 5,178,119 A | * | 1/1993 | Gale | 123/568.12 |
| 5,463,867 A | * | 11/1995 | Ruetz | 60/321 |
| 6,053,154 A | * | 4/2000 | Pott | 123/568.12 |
| 6,138,649 A | * | 10/2000 | Khair et al. | 123/568.12 |
| 6,244,256 B1 | * | 6/2001 | Wall et al. | 123/568.12 |
| 6,405,720 B1 | * | 6/2002 | Collier, Jr. | 123/568.12 |
| 6,467,257 B1 | | 10/2002 | Khair et al. | |
| 6,729,133 B1 | * | 5/2004 | Sorter et al. | 60/599 |
| 6,748,932 B1 | * | 6/2004 | Sorter et al. | 123/527 |
| 2003/0178002 A1 | * | 9/2003 | Israel et al. | 60/605.2 |
| 2004/0050374 A1 | * | 3/2004 | Aupperle et al. | 123/568.12 |

* cited by examiner

Primary Examiner—Willis R. Wolfe, Jr.
(74) Attorney, Agent, or Firm—Lee G. Meyer, Esq.; Meyer & Associates, LLC (57) ABSTRACT

A recycled exhaust gas cooling and condensate regulation system for a natural gas fired internal combustion engine driven co-generation plant, which allows efficient exhaust recycled gas combustion while maintaining lower head temperatures to reduce thermal $NO_x$ emissions and delivering increased process/utility heat to a proximate co-generation client, is provided. The recycled exhaust gas cooling and condensate regulation system has primary and secondary, air-to-gas, exchanger units, coupled in series, such that the first unit, designed to take exhaust gas exiting the engine, cools the gas to a first exhaust gas temperature effectively super saturating the water vapor in the cooled exhaust gas; and, the second unit, designed to handle lower inlet temperatures, condenses the water vapor and super cools the exhaust gas to <130 F. In one embodiment, the engine intake mixture including the exhaust gas is supercharged. In another embodiment, a separate intercooler circuit is used to cool the compressed intake charge containing the recycled gas prior to entry into the intake engine manifold to further reduce head temperatures and control thermal $NO_x$ emissions.

18 Claims, 2 Drawing Sheets

EGR COOLING AND CONDENSATE REGULATION SYSTEM FOR NATURAL GAS FIRED CO-GENERATION UNIT

CROSS-REFERENCE TO RELATED APPLICATION

The present application is a Continuation-in-Part of U.S. application Ser. No. 10/361,538 filed Feb. 10, 2003 for "Fuel Regulator for Natural Gas Fired Co-Generation", now U.S. Pat. No. 6,748,932, and is a U.S. application Ser. No. 10/838,126 filed May 3, 2004, which is a Continuation of U.S. application Ser. No. 10/356,826 filed Feb. 3, 2003 for "Heat Transfer System for Co-Generation Unit" now U.S. Pat. No. 6,729,133, all of said applications are herein incorporated by reference in their entirety.

BACKGROUND OF THE INVENTION

1. Field of the Invention

The present invention relates generally to recycled exhaust gas cooling systems for natural gas fueled internal combustion engines; and, more particularly, to systems for controlling temperature and condensate in cooled exhaust gas for recycle to natural gas fueled internal combustion engines to effect engine operating characteristics and emission control.

2. Description of Related Art

Electric energy generation in this country has lagged behind demand. There are a number of reasons for this, but chief among them is failure of traditional energy producers to replace spent units and capitalize new plants. This has been, in part, due to increased air quality regulations. In addition, new challenges face electric generation-security. Events of Sep. 11, 2001 showed this nation its vulnerability to terrorist attack. Vital operations, such as police, medical and civil defense that relied upon the electric power "grid" for service, realized that their needs were susceptible to disruption and viewed stand-alone unit alternatives as well as micro grids as a possible solution. These alternatives, however, have their own problems.

One reason for the growth in demand is the increased use of computers and other technology for industrial and business purposes, as well as personal use. As computer usage continues to grow, the use of power-consuming peripheral technologies, such as printers, cameras, copiers, photo processors, servers, and the like, keep pace and even expand. As business use of computer based equipment continues to rise, as do the number of in-house data servers, outsourced data storage facilities, financial systems, and Internet-related companies requiring constant electrical uptime and somewhat reducing traditional peak demand times, requirement for reliable, cheap, environmentally compliant electrical power continues to grow.

Other technological advances have also increased electrical energy demand. Increased use of power consuming devices in every aspect of life from medical to industrial manufacturing robots, as well as innovations in almost every research and industrial field are supported by increasingly complex technology, which requires more electrical power to function. CAT scans, NMRs, side looking X-rays, MRIs and the like all take electrical power.

As a result, the Federal Government deregulated power generation, and a number of states have begun to establish competitive retail energy markets. Unfortunately, the deregulation process has not provided adequate incentives for industry entities to construct generating facilities, upgrade the transmission grid, or provide consumers with price signals to enable intelligent demand-side management of energy consumption. With the deregulation in the utility market, energy (kWh) has become a commodity item that can be bought or sold. However, swings in supply and demand leave end users open to fluctuations in the cost of electricity.

According to the ETA, to meet projected increases in demand over the next 20 years, at least 393 GW of additional generating capacity must be added. In some areas, the growth in demand is much higher than the projected two percent average (e.g., California's peak electricity demand grew by 18 percent between 1993 and 1999, while generating capacity increased by only 0.3 percent.) Despite California's highly publicized energy situation, a similar problem exists for other states as well; the New York Independent System Operator recently stated that 8600 MW of additional generating capacity (a 25 percent increase) must be added by 2005 to avoid widespread shortages that may lead to blackouts.

In addition to the mismatch between demand and generating capacity, the physical transmission infrastructure necessary to deliver power from geographically remote generating facilities to the consumer's location is unable to support the increased load. Even under today's operating conditions, the transmission grid is subject to stress and occasional failure.

Additionally, security and reliability of source has become of increasing concern. Vulnerability of grid systems and blackouts has become more commonplace. Strategic industries are looking to cut energy costs, increase reliability, and assure security. This has lead to an interest in distributed market technologies. The potential market for distributed generation has become vast without adequate means for fulfilling this need. Again, inefficiency, reliability, and environmental concerns are major barriers. The compelling economics are made on engine efficiency without the financial benefit of waste heat usage, yet with all of the same customer reluctance to accept hassles. Industry estimates indicate that the existing market for distributed generation is $300 billion in the United States and $800 billion worldwide.

The need to leverage existing technology while transitioning to alternative energy sources is an important driver for meeting this challenge. Although most existing distributed generation sites use small gas turbine or reciprocating engines for generation, there are many alternatives that are being considered over the longer term. Technologies, such as micro turbines, are currently available, but only used at a relatively small number of sites. These newer generators offer some inherent advantages, including built-in communications capabilities. It is anticipated that fuel cells will be available in the next five years, which will provide some highly appealing, environmentally friendly options.

As it stands today however, small gas turbine and reciprocating engines comprise a substantial proportion of existing generator technology in the market and will for some time to come for a number of reasons. Engines provide the best conversion efficiency (40%), and they can operate using non-pressurized gas. Micro turbines, on the other hand, require compressed gas and conversion efficiency is lower (approximately 30%). These latter generators tend to be used in wastewater, landfill, and other specialty sites, where a conventional prime mover is unable to stand up to poor fuel quality. Therefore, for utilities to truly benefit from a distributed generation scheme over the short term, they must look to the existing generator technology to provide a sustainable and affordable solution.

Waste heat utilization or co-generation is one way to meet this challenge. In the case of power generation, the waste heat is not used, and the economics are based largely on the cost of the electricity produced (i.e. heat rate is paramount), with little consideration for improved reliability or independence from the electric grid. The anticipated fluctuation in energy costs, reduced reliability, and increasing demand has led end users to consider maximizing efficiency through use of heat from generation of on-site generating-heat capture systems, i.e. co-generation, or "Combined Heating and Power" (CHP).

Co-generation of electricity and client process/utility service heat to provide space heating and/or hot water from the same unit is one solution. Co-generation provides both electricity and usable process or utility heat from the formerly wasted energy inherent in the electricity generating process. With co-generation, two problems are solved for the price of one. In either case, the electricity generation must meet stringent local air quality standards, which are typically much tougher than EPA (nation wide) standards.

On-site co-generation represents a potentially valuable resource for utilities by way of distributed generation. A utility can increase capacity by turning to a "host" site (e.g. industrial user) with an existing generator, and allow them to parallel with the grid and use their generator capacity to handle peak volumes. From the utility's point of view, the key advantages to a distributed generation solution are twofold: improved system reliability and quality; and the ability to defer capital costs for a new transformer station.

For customers who can use the process/utility waste heat, the economics of co-generation are compelling. The impediment to widespread use is reliability, convenience, and trouble-free operation. Co-generation products empower industrial and commercial entities to provide their own energy supply, thus meeting their demand requirements without relying on an increasingly inadequate public supply and infrastructure. Unfortunately, to date, the most widespread and cost-effective technologies for producing distributed generation and heat require burning hydrocarbon-based fuel. Other generating technologies are in use, including nuclear and hydroelectric energy, as well as alternative technologies such as solar, wind, and geothermal energy. However, burning hydrocarbon-based fuel remains the primary method of producing electricity. Unfortunately, the emissions associated with burning hydrocarbon fuels are generally considered damaging to the environment and the Environmental Protection Agency has consistently tightened emissions standards for new power plants. Green house gases, as well as entrained and other combustion product pollutants, are environmental challenges faced by hydrocarbon-based units.

Of the fossil fuels, natural gas is the least environmentally harmful. Most natural gas is primarily composed of methane and combinations of Carbon Dioxide, Nitrogen, Ethane, Propane, Iso-Butane, N-Butane, Iso-Pentane, N-Pentane, and Hexanes Plus. Natural gas has an extremely high octane number, approximately 130, thus allowing higher compression ratios and broad flammability limits. Natural gas is the most popular fuel choice for engine cogeneration because it is relatively clean, already widely distributed, safe, and it provides favorable engine power and durability. However, many of the markets that would be best served by the economics of engine-based co-generation have such poor air quality that strict exhaust emission limits have been instituted by air quality regulating agencies. The exhaust emissions limits on oxides of nitrogen, carbon monoxide, and non-methane hydrocarbons are so restrictive that no technology exists to allow raw exhaust emissions from any engine operating on any hydrocarbon fuel to enter the atmosphere without exhaust aftertreatment and a variety of other strategies. problem area is the emissions produced by these natural gas engines. Never-the-less, natural gas fueled engines provide a valuable power source for distributed generation.

Internal combustion engines utilized for combined heat and power are designed so that heat generated during combustion can be recovered from the engine coolant and exhaust and then transferred to a cogeneration client. Prior art co-generation systems have had to comply with strict emissions limits by either altering the air/fuel ratio from an excess-air strategy to a stoichiometric strategy to facilitate the successful operation of non-selective three-way catalysts or by applying selective catalytic reduction (SCR) exhaust aftertreatment technologies to the exhausts of excess-air fueled engines. Each approach has undesirable consequences compared to the original excess-air, or lean-burn, operation. The stoichiometric air/fuel ratio with three-way catalyst strategy increases combustion temperatures to such an extent that the engine must be derated to control detonation and mitigate accelerated wear. This scenario also results in reduced fuel efficiency compared to a lean-burn engine. The SCR emissions compliance approach allows a lean-burn engine to operate at full load with excellent fuel efficiency, but at the expense of having to store chemicals on site and then inject them in a very controlled fashion into the lean-burn exhaust stream. After injection the exhaust becomes compatible with catalytic emissions reduction techniques.

Thus, applying SCR technology is expensive, complicated, and generally not considered an option for engines producing less than one megawatt of electric power. Prior art co-generation systems employing internal combustion engines, and specifically, natural gas fueled engines, have suffered from the myriad of problems including elevated head temperatures and inability to deliver large quantities of process and/or utility heat not true to the co-generation client. Excessive head temperatures lead to inefficient operation and unacceptable environmental conditions, which include excessive use of fuel as well as significant thermal $NO_x$ production.

It is well known that emission reduction for natural gas engines can be accomplished by recycling of exhaust gases to make the engines "run lean." This is the same term used to describe the diluted air/fuel condition that exists when excess-air is introduced into combustion. This method of combustion combines the positive cool combustions and high fuel efficiency attributes of operating with excess air with the compatibility between simple non-selective three-way catalysts and exhaust that stoichiometric engines benefit from without incurring the need to derate the output of the engine. This method of emission control has decided advantages over exhaust gas after treatment such as a catalyst. When catalysts are still required they are minimized.

For this reason, numerous systems have been devised to recycle exhaust gas into the fuel-air induction system of an internal combustion engine for the purposes of pre-heating the air-fuel mixture to facilitate its complete combustion in the combustion zone, for re-using the unignited or partially burned portions of the fuel which would otherwise pass to exhaust and into the atmosphere, and for reducing the oxides of nitrogen emitted from the exhaust system into the atmosphere. It has been found that approximately 15% to 20% exhaust gas recycling is required at moderate engine loads to substantially reduce the nitrogen oxide content of the exhaust gases discharged in the atmosphere, that is, to below about 1,000 parts per million.

Although the prior art systems have had the desired effect of reducing nitrogen oxides in the exhaust by reducing the maximum combustion temperature as a consequence of diluting the fuel-air mixture with recycled exhaust gases during certain operating conditions of the engine, these systems have not been experienced broad market application in the field of cogeneration where continuously high engine output is the normal mode of operation and the level technological implementation on engine controls often lacks the automotive market.

The formation rate of nitrogen oxide emission is a direct function of combustion temperature. Any incremental increase in rate of cooled EGR applied during combustion at any load results in lower peak combustion temperatures and hence lower untreated $NO_x$ emissions. The propensity for detonation, another temperature dependent phenomenon, is also reduced for each incremental increase in cooled EGR. EGR rates from 20–25% are generally required to achieve similar detonation control characteristics and raw engine-out $NO_x$ formation rates as compared to high excess-air strategies.

Thus, natural gas engine survivability with regards to detonation at high load is largely dependent on the success of appropriately metering and cooling the recirculated exhaust gas. While there are numerous products available commercially for the accurate control and metering of the amount of excess-air used in traditional lean-burn (lambda>1) engines, the same is not true for recirculated exhaust gas metering and cooling in non-automotive applications. The industrial nature of the cogeneration market does not benefit from the research and development budgets of the mass produced automotive products and thus the application of advanced emissions control techniques such as cooled EGR has thus far been limited. One challenges for applying EGR highly loaded natural gas engines includes is to provide sufficient cooling of the recirculated exhaust gas such that impacts on volumetric efficiency of air induction are minimized. The higher the temperature of the recirculated exhaust gas as it enters the air/fuel stream, the more difficult it becomes to induce adequate air flow to support full load combustion. Furthermore, the higher the EGR temperature, the higher the compressed intake charges temperature from the turbocharger both before and after the charge-air intercooler. The higher the EGR temperature induced into the air stream, the more this higher temperature offsets the benefits of EGR with regards to detonation mitigation.

Natural gas fired, internal combustion driven, co-generation systems have previously suffered from one or more disadvantages. Specifically, the EGR system did not recycle exhaust gas to the intake engine manifold at sufficiently low temperature to foster low cylinder head temperatures. Simultaneously, turbo charged fuel systems, because of the compression, increase intake fuel manifold temperatures causing the same effect. This combination of disadvantages made natural gas fueled, internal combustion driven co-generation systems a marginal candidate for client based distributed generation complexes.

Additionally, since combustion of natural gas (methane) produces large amounts of water, this water is entrained as vapor in the exhaust gas. Although reducing the temperature of the exhaust gas allows more volume of gas to be introduced into the intake gas in the manifold, it can also present a water vapor saturated exhaust gas mixture, which precipitates at the carburetion site. Thus, cooling of the gas in a non-regulated manner can present condensation problems in the intake venturi. If the gas is cooled in the EGR cooler, so that the vapor pressure in the exhaust gas approaches saturation, further cooling by introduction of air and fuel causes an immediate condensation within the intake manifold, which can lead to erratic engine performance, corrosion, and the like.

In addition, the presence of large amounts of water vapor in the recycled exhaust gas displaces other combustion gases in the intake manifold making the engine unstable. Problematically, introducing the recycle gas at a temperature above the dew point (to prevent induction condensation) leads to detonation and $NO_x$ production causing the engine to burn out of $NO_x$ emission ranges as well as shorting engine life. Contrawise, some water vapor in the recycled exhaust gas is beneficial to the engine performance.

The previous solution was to increase the capacity of the primary cooler. However, in addition to being hard to "tune", large primary coolers are expensive because they must handle very high temperatures and corrosive media. Because the volume of very hot gas varies as the engine accelerates or decelerates, the water vapor in the exhaust gas exiting such primary coolers, is difficult to regulate. When the cooler is a single unit, it is difficult to incrementally vary the composition of the output gas.

Typical prior art exchangers are gas-to-liquid, not gas-to-air. These heat exchangers are found commercially on heavy-duty truck and bus engines for the purpose of cooling re-circulated exhaust gas for diesel emissions compliance. However, the dynamics of these systems are different. For all the reasons mentioned above, these engines have different operating characteristics than natural gas fueled engines. First, the engine's coolant is typically the cooling medium in order to achieve exhaust gas cooling in a minimum amount of space. This inherently limits the minimum EGR temperature that can be achieved to well over 200° F. even with the best of liquid-to-gas heat exchangers. For diesel engines, this does not pose a serious threat to engine life because detonation is not a concern with compression ignition engines. Second, gas and diesel engine, liquid-to-gas, EGR cooling heat exchangers are typically of stainless steel construction in flat-plate and tube-in-shell configurations. This design is very expensive, but necessary to handle the exhaust gas heat.

In addition, certain spark ignited engines, such as gasoline and natural gas fueled engines, have different EGR constraints than compression ignition engines, such as diesel. In automotive gasoline engines, EGR is a prevalent emissions reduction technique. However, gasoline engine using EGR emission control do not require dedicated EGR cooling because: 1) the EGR rate is usually limited to 10–12% minimizing the impact on charge-air temperatures; and; 2) the EGR is not employed at high load where temperature-influenced ignition is of most concern.

It would, therefore, be advantageous to have an air-to-gas cooled system wherein recycled exhaust gas temperature and vapor pressure could be regulated to maintain engine performance and emission compliance through out the load range while preventing inadvertent condensation within the intake manifold which causes sporadic engine performance and reduces engine life. It would be further advantageous to have an air-to-gas cooled system which allows the natural gas fired internal combustion engine using EGR to operate at higher shaft power output without inducing detonation; allows the engine to operate with better fuel efficiency due to increased detonation tolerance when advancing ignition timing; and, allows the engine to operate at the same maximum continuous power output. In addition, it would be advantageous to have an EGR cooling system which could be "tuned" to facilitate using recycled exhaust gas for a lean burning natural gas fired engine which results in not only a lean burn but also reduced head temperatures leading to reduces thermal emissions and greater efficiency without unwanted detonations and/or water condensation within the intake manifold.

SUMMARY OF THE INVENTION

It has now been unexpectedly discovered that the use of at least one air-to-gas condensing cooler, downstream of a primary exhaust gas air-to-gas cooler, allows increased efficiency of a natural gas fired co/generation system through out the load range, while cooling cylinder combustion temperatures, reducing unwanted condensation within the intake manifold, and controlling propagation to effect a reduced $NO_x$ emission at increased efficiency. The instant EGR cooling system allows EGR recycle rates above 10% by achieving a superior level of controlled EGR cooling and water vapor regulation (>900° F. exhaust reduced to <130° F.) as compared to existing gas-to-air heat exchanger designs.

The instant EGR cooling system also provides uniform service over a greater range of altitude variation while achieving better condensate removal from the re-circulated exhaust stream before re-entry into the intake air stream. The instant gas-to-air exchange system can be used downstream of a gas-to-liquid liquid fluid cooled exhaust gas manifold recirculation system which provides heat for the utility side of the co-generation system. The system of the instant invention allows two independent cooling stages of different construction methodologies, both of which employ air-to-gas cooling with entrained water vapor condensing capabilities in the second stage.

The exhaust gas cooling and condensate regulation system for a natural gas fueled, internal combustion engine driven co-generation unit utilizing recycled exhaust gas of the instant invention includes two stages of cooling of a first air-to-gas cooling unit for cooling the exhaust gas to be recycled, and at least one second air-to-gas cooling unit for further cooling said exhaust gas and condensing entrained water vapor in said exhaust gas. The first unit has an inlet in communication (directly or indirectly) with the exhaust ports of the internal combustion engine and an outlet in communication with the inlet of the second. The outlet of the second in turn communicates with induction air ingested into the fuel inlet port of the natural gas fueled internal combustion engine.

Advantageously, the exhaust gas exiting the second unit enters a condensation storage/removal unit prior to entering the engine intake air stream. In this manner, the water vapor condensed can be removed from the recycle system and discarded or reused, for example, as a further cooling medium or it can be reintroduced into the engine intake manifold to regulate the temperature and/or performance of the engine.

In accordance with a further embodiment, a fluid cooled manifold between the inlet of the first air-to-gas cooling unit and the exhaust ports of the internal combustion engine is used to initially remove heat from the engine exhaust for use in co-generation heat transfer. The system of the instant invention is useful when the engine is turbocharged. Advantageously, an exhaust gas driven turbocharger placed between the inlet of the first air-to-gas cooling unit and the exhaust ports of the internal combustion engine tubocharges the admixture entering the inlet manifold of the internal combustion engine.

The exhaust gas cooling and condensate regulation system advantageously uses an air-to-gas cooling unit which has an inlet plenum in communication with the inlet and a serpentine channel disposed about cooling fins, wherein said serpentine channel communicates with an outlet plenum which in turn communicates with the outlet such that exhaust gas entering the inlet is caused to pass through the serpentine channel to exit the outlet. Air is forced over the fins to dissipate the heat expelled by the exhaust gas passing through the serpentine channel. The exhaust gas passing through the serpentine channel is cooled and entrained water vapor condensed, which is advantageously drained to a collection device for storage and/or removal, by means of for example a sealable valve.

An exemplary exhaust gas cooling and condensate regulation system of the instant invention cools exhaust gas entering the first air-to-gas cooling unit is about 925° F. and said system exhaust gas exiting the at least one second air-to-gas cooling unit is less than 130° F. In another embodiment, a separate intercooler circuit is used to cool the compressed intake charge containing the recycled gas prior to entry into the intake engine manifold to further reduce head temperatures and control thermal $NO_x$ emissions.

In the instant inventive method, exhaust gas from the exhaust ports of an engine is caused to pass through a first cooling unit and then through a second unit to super cool and condense entrained water vapor prior to entry into the engine intake air stream.

BRIEF DESCRIPTION OF THE DRAWINGS

The following drawings form part of the present specification and are included to further demonstrate certain embodiments. These embodiments may be better understood by reference to one or more of these drawings in combination with the detailed description of specific embodiments presented herein.

DETAILED DESCRIPTION OF EMBODIMENTS OF THE INVENTION

In accordance with the instant invention, a natural gas fueled, internal combustion engine, employing exhaust gas recycle (EGR), delivers power to spin a coupled electric turbine, as well as heat of combustion, through a heat exchanger, to a co-generation process/utility heat loop for on site use as heat for process water, utility heat, space heat, potable hot water, and the like. This is accomplished with the instant system by increasing the transfer of engine heat to the co-generation process/utility heat loop while maintaining the engine, and especially the cylinder combustion temperature low enough to increase efficiency and reduce thermal $NO_x$ to acceptable levels, even in the presence of the recycled exhaust gas. This is accomplished with substantially no increase in parasitic power requirements, such as adding external pumps to increase the flow through the heat exchanger and decreased necessity for catalytic exhaust system clean up.

As air is inducted into the cylinders of an engine, it passes through a device that induces the flow of exhaust gases through the EGR cooling circuit. The EGR source is a fraction of the exhaust leaving the turbocharger turbine. As the exhaust discharges out of the turbine it branches into two exhaust circuits. The majority of the exhaust gas passes through a three-way catalyst and then through an exhaust gas silencer before emptying to the atmosphere.

A smaller fraction of the exhaust gas, typically 20–25%, is induced to flow through the EGR cooling circuit which first travels through the primary EGR cooling section, a coiled length of 2'–5" diameter stainless steel convoluted tubing. The convolutions provide greater surface area for heat transfer per unit length. The convoluted tubing is wrapped around the base of a fan motor inside a large radiator plenum. The fan draws ambient air through the engine coolant radiators in order to cool the engine coolant. Thus, the cooling air is heated as it enters the radiator plenum, having achieved its primary purpose of cooling the engine coolant. This heated air is then drawn around the hot convoluted tubing and performs convective cooling of the exhaust gas before being discharged through the fan blades. Even though the air is heated prior to encountering the convoluted tubing carrying the exhaust gas, it is still far below the source temperature of the exhaust, thereby resulting in substantial cooling of the exhaust. Exhaust may enter the convoluted coil at 925° F. and leave the coil at 250–300° F.

After the first stage of EGR cooling, the semi-cooled EGR then flows through a fixed orifice used to grossly tune the magnitude of EGR flow, and then through the secondary EGR cooler, a flat plat condensing heat exchanger. The entering exhaust gas is hot enough that the water in the exhaust is still superheated steam as it enters the secondary cooler. However, the entering exhaust gas is also cool enough not to melt the sealants that secure the individual flat plate flow paths to the inlet and outlet plenums of the heat exchanger (important since the secondary EGR cooler is not fabricated with metal welds). As the exhaust gas travels through the secondary EGR cooler, it is further cooled by fresh air induced to flow over the plates of the cooler by the generator fan. The generator fan has more than enough air flow capacity to cool the EGR and itself. As the exhaust gas cools through the length of the secondary cooler, the superheated steam begins to condense out of the exhaust stream. This condensate accumulates at the discharge of the cooler and is collected in a condensate storage/removal trap before being discharged. The exhaust gas leaves the secondary EGR cooler at 110–130° F.

The re-circulated exhaust gas, having been super cooled through these parallel exchangers (from approximately 925° F. to about 120° F.), then flows into the EGR device positioned in the intake air stream which induced the flow in the first place. Here, the cooled EGR is mixed with fresh air from the air filter, raising the intake air temperature only slightly before going on its way towards fuel mixing, turbocharger compression, charger inter-cooling, and, finally, combustion.

In accordance with one aspect, the system employs a separate loop to cool supercharged engine inlet feed. This separation of the intercooler liquid coolant loop from the engine coolant loop provides a separate heat exchanger upstream of the engine intake manifold to reduce engine intake temperatures, drastically reducing cylinder compustion temperatures within the engine. Likewise, in a further aspect the exhaust recycle gas is cooled by at least one air cooled radiator prior to admixing it with air and fuel which is then compressed in the supercharger.

The power source compatible with the instant invention is a natural gas fueled, internal combustion liquid cooled engine, wherein at least a portion of the exhaust gas is recycled to reduce $NO_x$. For example, a Deutz brand Engine Model BE 8 M 1015 GC engine manufactured by Deutz. The natural gas fired internal combustion engine is the prime mover of the electrical generation system. The internal engine pump moves the coolant through the various engine components and then through the process a heat exchanger to transfer heat to the co-generation process/utility the system.

Figure 1:
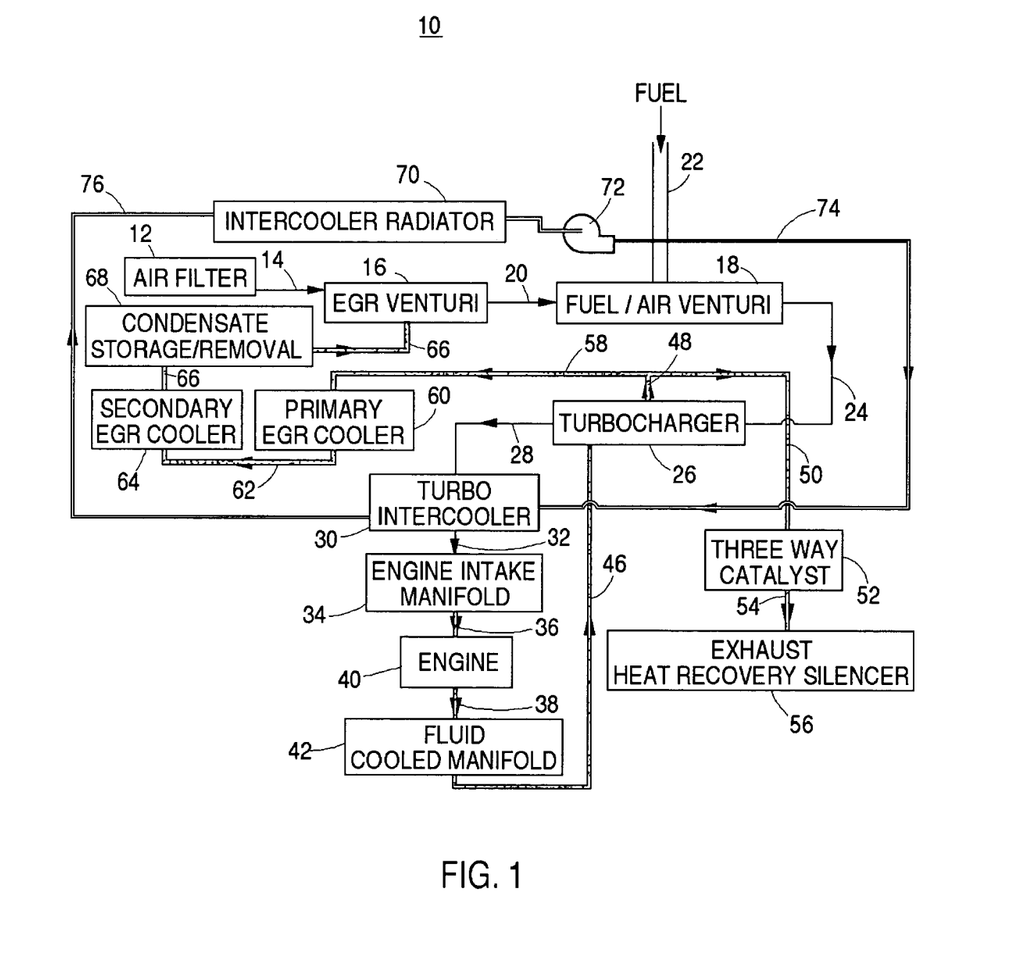
FIG. 1 is a flow chart detail of the dual EGR cooler system in accordance with the instant invention in integration with the EGR air venturi; the exhaust gas recycle/air-fuel venturi; the fuel air venturi system of the instant invention with a turbocharger intercooler radiator loop interface, the engine intake gas system and the engine exhaust system.

Turning to the drawing, there is shown in FIG. 1, the system 10, incorporating the dual heat exchanger/vapor condenser system in accordance with the instant invention. In accordance with FIG. 1, ambient outside air passes through air filter 12 and intake conduit 14 to EGR venturi 16, where air is mixed with recycled exhaust gas from conduit 66, as will be more fully described below. EGR venturi 16 is upstream of fuel/air venturi 18. Mixed air and exhaust gas exit EGR venturi 16 through intake conduit 20 into fuel/air venturi 18 where the air/exhaust gas mixture entrains fuel from a fuel regulator (not shown). The fuel enters the fuel/air venturi 18 by means of fuel line 22. The fuel/air/exhaust gas mixture exits fuel/air venturi 18 via turbocharger intake conduit 24 and is compressed in turbocharger 26. The turbocharger, which is operated by engine exhaust, creates a vacuum on turbocharger intake conduit 24 which is translated back through the system to operate the fuel regulator.

The compressed fuel/air/recycled exhaust gas mixture exits turbocharger 26 through turbo intercooler intake conduit 28 into turbo intercooler 30 where it is cooled from about 380° F. to 155° F. Coolant is continually circulated from turbo intercooler 30 by conduit 76 into intercooler radiator 70, pump 72, and coolant circulating conduit 74 in a closed loop, to cool the compressed fuel/air/recycled exhaust gas mixture. The cooled intake gas (exhaust gas/air/fuel) exits turbo intercooler 30 into engine intake manifold 34 via engine intake conduit 32 and through engine intake manifold 34 into engine cylinders 40 via interface 36.

Exhaust gas from engine cylinders 40 exits into fluid cooled manifold 42 through interface 38, as more fully described below, and enters the turbine side of turbocharger 26 through exhaust conduit 46 to power the turbocharger 26, thus compressing the fuel/air/recycled exhaust gas mixture entering turbocharger 26 by means of turbo intercooler intake conduit 28, as previously described. As can be seen, exhaust gas exiting turbocharger 26 is split via "T" 48 into a recycled stream and an exhaust stream. The exhaust stream, moved via conduit 50, enters three-way catalyst 52 and then by way of conduit 54 to exhaust heat recovery silencer 56. One skilled in the art will realize that the exhaust heat recovery silencer 56 is on the co-generation process/utility heat system and provides additional heat recovery for that system (not shown).

The portion of the exhaust gas to be recycled at about 925° F. passes through conduit 58 to primary air cooled EGR cooler 60. The exhaust gas leaves the primary air cooled EGR cooler 60 at about 250–300° F. and, then passes into secondary air cooled EGR cooler 64 by means of conduit 62. The exhaust gas entering secondary air cooled EGR cooler 64 contains super heated steam which is condensed inside secondary air cooled EGR cooler 64. The condensate is trapped in condensate storage/removal unit 68 while the cooled de-vaporized exhaust gas passes into EGR venturi 16 through conduit 66 at about 120–130° F.

The pressurization of the air/exhaust gas/fuel mixture by turbocharger 26 creates a vacuum upstream, as previously described. As fuel is pulled through fuel/air venturi 18, it creates a vacuum, which is transferred through fuel line 22 to fuel regulator (not shown) of the carburetion/exhaust system 10, in accordance with the instant invention. Thus, in accordance with the invention, ambient air (70° F.) flows through air filter to EGR venturi where it is mixed with up to 20% cooled exhaust gas (120–130° F.) at 100% load. The percent of recycled exhaust gas utilized is a function of engine load. This mixture (120–130° F.) then passes through the fuel/air venturi where fuel is drawn from the gas regulator and mixed with the ambient air and exhaust gas to be flowed to the intake side of the turbocharger. The fuel/air/recycle exhaust gas mixture is then pressurized by an exhaust gas-powered turbine to a pressure of 15 PSIG at a temperature of about 380° F. This pressurized mixture passes through the turbocharger intercooler, which reduces the pressurized, high temperature mixture to about 155° F. to be introduced into the intake manifold and then to the engine cylinders.

Following combustion, exhaust gas from the cylinders (1150° F.) passes through the fluid-cooled manifolds (FIG. 1) to recover heat, which reduces the exhaust gas temperature. The exit exhaust gas enters the exhaust (turbine section) of the turbocharger and, upon exiting, at about 925° F. passes through a "T" with about 80% of the gas being flowed through a catalyst and a heat recovery silencer or muffler as previously described, and exhausted to atmosphere. A second portion comprising about 20% of the exhaust gas is passed through the EGR cooling and condensate regulation system of the instant invention, as previously described, to the EGR venturi for introduction to the air/fuel intake system. The recycled exhaust gas is cooled by EGR cooling and condensate regulation system to from about 110° F. to 130° F. prior to admixing with air in the EGR venturi.

The condensate generated in the EGR circuit during cooling in the secondary EGR cooler is removed by a device that takes advantage of the momentum of the exhaust constituents and the inertia difference between gaseous products and the liquid condensate. After exiting the secondary EGR cooler, the cooled EGR and associated condensed water are forced to travel downwards through a vertical tube. The end of this tube is open and terminates several inches above the closed end of another larger tube that surrounds the first. At the top of the second vertically oriented larger tube is an exit for cooled EGR to escape and travel to the EGR metering device in the intake air stream. (see FIG. 2)

Figure 2:
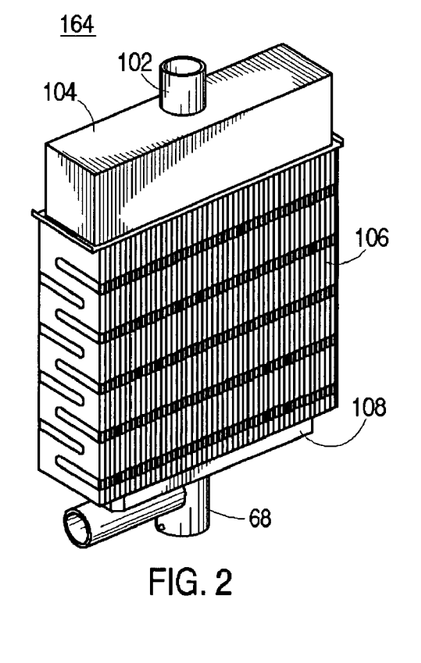
FIG. 2 is a perspective view of the secondary heat exchanger/vapor regulator in accordance with the instant invention with a vapor condensate unit disposed on the outlet side of the secondary heat exchanger/vapor regulator.

The sharp 180 degree is easily managed by the light gaseous products. However, the condensate with much higher inertia than the gaseous products cannot manage such a turn without impinging the lower walls of the larger outside tube. Once the water particles collide with the lower walls gravity keeps them from following the gaseous EGR stream up through the vertical path to the exit port that leads to the intake air. A simple U-tube drain, for example, is used to remove the water while maintaining a barrier between outside air and the cooled EGR.

Figure 3:
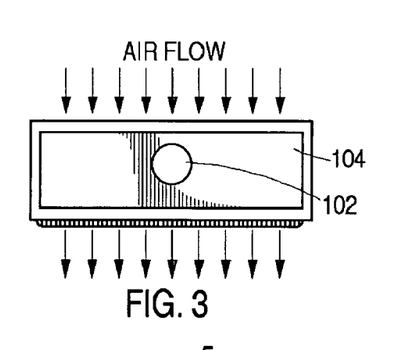
FIG. 3 is a top view of the secondary heat exchanger/vapor regulator in accordance with the instant invention showing the flow pattern of the coolant air through the secondary heat exchanger/vapor regulator structure.
Figure 4:
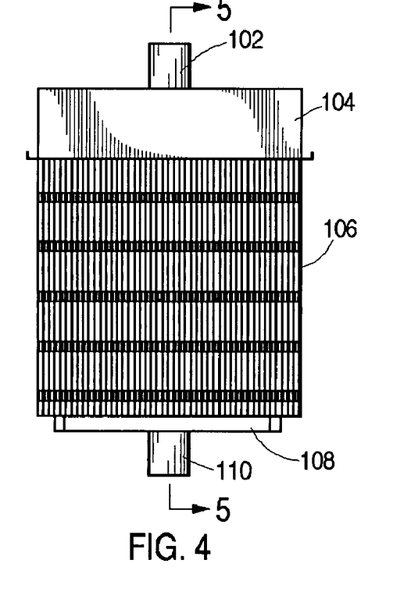
FIG. 4 is a is a front view of the secondary heat exchanger/vapor regulator in accordance with the instant invention; and, FIG. 5 is a sectional view of the secondary heat exchanger/vapor regulator in accordance with the instant invention along lines 5—5 of FIG. 4.

Turning to FIG. 2, there is shown an exemplary secondary EGR cooler 164 with condensate storage removal trap 68 as described above affixed to the outlet 110 of the secondary EGR cooler 164. The cooler has an EGR inlet 102, which communicate with an EGR inlet plenum 104. As better seen in FIG. 5, the plenum 104 communicates with a serpentine channel 112 formed around condensing fins 106. Serpentine channel 112 communicates with EGR outlet plenum 108, which communicates with EGR outlet 110. In operation, as better seen in FIG. 3, forced air is caused to flow through secondary EGR cooler 164 by entering through condensing fins and exiting the rear of the secondary EGR cooler 164, as shown.

Figure 5:
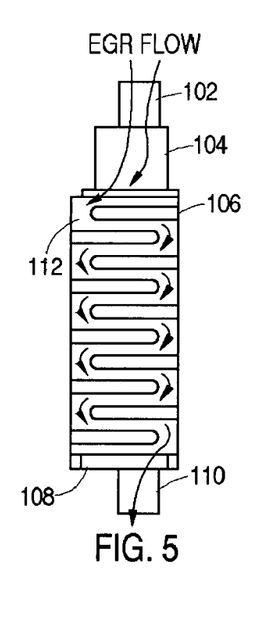

As shown in FIG. 5, EGR entering the secondary EGR cooler 164 flows through EGR inlet 102, flows though EGR inlet plenum 104 into serpentine channel 112 and, thus, is forced passed condensate fins 106 where it is cooled and water vapor, which condenses on the fins flows in a similar manner exiting the secondary EGR cooler by means of the EGR outlet plenum 108 and finally, EGR outlet 110. The condensate is caused to collect in condensate storage removal unit 68, as shown in FIG. 2, while the cooled EGR gas flows through conduit 66 into EGR venturi 16 as shown in FIG. 1.

In this manner, a cheap, inexpensive secondary cooling system allows primarily cooled EGR from the primary EGR cooler to be further cooled prior to entry into the EGR venturi. Additionally, water vapor, which occupies volume in the recycled EGR and contributes to the EGR intake air temperature, is selectively removed. Thus, this system not only further cools the recycled EGR stream, but allows the larger volume of EGR gas to be re-introduced into the engine intake at a cooler temperature, thus, reducing the cylinder temperature to produce a compliant lean burn. It will be realized by the skilled artisan that more than one secondary cooler can be used in accordance with the invention. These secondary coolers can be stacked in series or in parallel.

The foregoing discussions, and examples, describe only specific embodiments of the present invention. It should be understood that a number of changes might be made, without departing from its essence. In this regard, it is intended that such changes—to the extent that they achieve substantially the same result, in substantially the same way—would still fall within the scope and spirit of the present invention.

What is claimed is:

1. An exhaust gas cooling and condensate regulation system for a natural gas fueled, internal combustion engine driven co-generation unit utilizing recycled exhaust gas comprising:
    (a) a first air-to-gas cooling unit for cooling the exhaust gas to be recycled, having an inlet in communication with the exhaust ports of the internal combustion engine and an outlet; and,
    (b) at least one second air-to-gas cooling unit for further cooling said exhaust gas and condensing entrained water vapor in said exhaust gas, having an inlet in communication with the outlet of the first air-to-gas cooling unit and an outlet in communication with the fuel inlet port of the internal combustion engine wherein said first air-to-gas cooling unit and said second air-to-gas cooling unit operate, in cooperation, to achieve controlled exhaust gas cooling and water vapor regulation by selective condensation.

2. The exhaust gas cooling and condensate regulation system of claim 1 wherein said system further comprises at least one condensation storage/removal unit between the at least one second air-to-gas cooling unit outlet and the fuel inlet port of the internal combustion engine to remove condensate from the cooled exhaust gas.

3. The exhaust gas cooling and condensate regulation system of claim 1 wherein said system further comprises a fluid cooled manifold between the inlet of the first air-to-gas cooling unit and the exhaust ports of the internal combustion engine to initially remove heat from the engine exhaust for use in the co/generation heat transfer.

4. The exhaust gas cooling and condensate regulation system of claim 1 wherein said system further comprises an exhaust gas driven turbocharger between the inlet of the first air-to-gas cooling unit and the exhaust ports of the internal combustion engine to tubocharge the admixture entering the inlet manifold of the internal combustion engine.

5. The exhaust gas cooling and condensate regulation system of claim 1 wherein said at least one second air-to-gas cooling unit comprises an inlet plenum in communication with the inlet and a serpentine channel disposed about cooling fins, and wherein said serpentine channel communicates with an outlet plenum which in turn communicate with the outlet such that exhaust gas entering the inlet is caused to pass through the serpentine channel to exit the outlet.

6. The exhaust gas cooling and condensate regulation system of claim 1 wherein a separate intercooler circuit is used to cool the compressed intake charge containing the recycled gas prior to entry into the intake engine manifold to further reduce head temperatures and control thermal $NO_x$ emissions.

7. The exhaust gas cooling and condensate regulation system of claim 1 wherein the system exhaust gas entering the first air-to-gas cooling unit is about 925° F. and said system exhaust gas exiting the at least one second air-to-gas cooling unit is less than about 125° F.

8. A method for super cooling and removing condensate in recycled exhaust gas in a natural gas fueled, internal combustion engine driven co-generation unit comprising the steps of:
 (a) passing exhaust gas from the exhaust ports of the internal combustion engine through a first air-to-gas cooling unit to initially cool the exhaust gas; and,
 (b) subsequently passing said exhaust gas exiting from said first air-to-gas cooling unit through a second air-to-gas cooling unit to super cool said exhaust gas and condense entrained water vapor;
 (c) passing said super cooled exhaust gas into the intake manifold of said engine wherein said first air-to-gas cooling unit and said second air-to-gas cooling unit operate, in cooperation, to achieve controlled exhaust gas cooling and water vapor regulation by selective condensation.

9. The method of claim 8 wherein said exhaust gas further passes through at least one condensation storage/removal unit between the at least one second air-to-gas cooling unit and intake manifold of said engine to remove condensate from the EGR system.

10. The method of claim 8 wherein said exhaust gas further passes through a fluid cooled manifold between the first air-to-gas cooling unit and the exhaust ports of the internal combustion engine to initially remove heat from the engine exhaust for use in the co/generation heat transfer.

11. The method of claim 8 wherein said exhaust gas first passes through an exhaust gas driven turbocharger between the first air-to-gas cooling unit and the exhaust ports of the internal combustion engine to turbocharge the admixture entering the inlet manifold of said engine.

12. The method of claim 8 wherein said exhaust gas further passes through at least one second air-to-gas cooling unit comprising an inlet plenum in communication with the inlet and a serpentine channel disposed about cooling fins, and wherein said serpentine channel communicates with an outlet plenum which in turn communicate with the outlet such that exhaust gas entering the inlet is caused to pass through the serpentine channel to exit the second air-to-gas cooling unit.

13. The method of claim 8 wherein said exhaust gas further passes through a separate intercooler circuit to cool the compressed intake charge containing the recycled gas prior to entry into the intake engine manifold to further reduce head temperatures and control thermal $NO_x$ emissions.

14. The method of claim 8 wherein said exhaust gas entering the first air-to-gas cooling unit is about 925° F. and the exhaust gas exiting the at least one second air-to-gas cooling unit is less than about 125° F.

15. An exhaust gas cooling and condensate regulation system for a natural gas fueled, internal combustion engine driven co-generation unit having a supercharger and utilizing recycled exhaust gas comprising:
 (a) a fluid cooling system for cooling said internal combustion engine which fluidly communicates with a fluid cooled manifold to initially cool the exhaust gas exiting the engine,
 (b) a turbo intercooler unit for cooling the compressed air/recycle exhaust gas/fuel intake admixture prior to said admixture entering the engine intake manifold comprising a fluid cooled compressed air/recycle exhaust gas/fuel intake admixture radiator in liquid communication with an intercooler radiator for exhausting heat from said coolant and a circulation pump for circulating said coolant;
 (c) a first air-to-gas cooling unit for cooling the exhaust gas to be recycled, having an inlet in communication with the exhaust ports of the internal combustion engine and an outlet; and,
 (d) at least one second air-to-gas cooling unit for further cooling said exhaust gas and condensing entrained water vapor in said exhaust gas, having an inlet in communication with the outlet of the first air-to-gas cooling unit and an outlet in communication with the fuel inlet port of the internal combustion engine wherein said first air-to-gas cooling unit and said second air-to-gas cooling unit operate, in cooperation, to achieve controlled exhaust gas cooling and water vapor regulation by selective condensation.

16. The exhaust gas cooling and condensate regulation system of claim 15 wherein said system further comprises at least one condensation storage/removal trap between the at least one second air-to-gas cooling unit outlet and the fuel inlet port of the internal combustion engine to remove condensate from the cooled exhaust gas.

17. The exhaust gas cooling and condensate regulation system of claim 15 wherein said at least one second air-to-gas cooling unit comprises an inlet plenum in communication with the inlet and a serpentine channel disposed about cooling fins, and wherein said serpentine channel communicates with an outlet plenum which in turn communicate with the outlet such that exhaust gas entering the inlet is caused to pass through the serpentine channel to exit the outlet.

18. The exhaust gas cooling and condensate regulation system of claim 15 wherein the system exhaust gas entering the first air-to-gas cooling unit is about 925° F. and said system exhaust gas exiting the at least one second air-to-gas cooling unit is less than about 125° F.

* * * * *